March 28, 1961 A. SERAGNOLI 2,976,825
MECHANISMS FOR DELIVERING ARTICLES INTO A
MACHINE, PARTICULARLY ADAPTED TO DELIVER
CARAMELS INTO WRAPPING MACHINES
Filed April 10, 1957 3 Sheets-Sheet 1
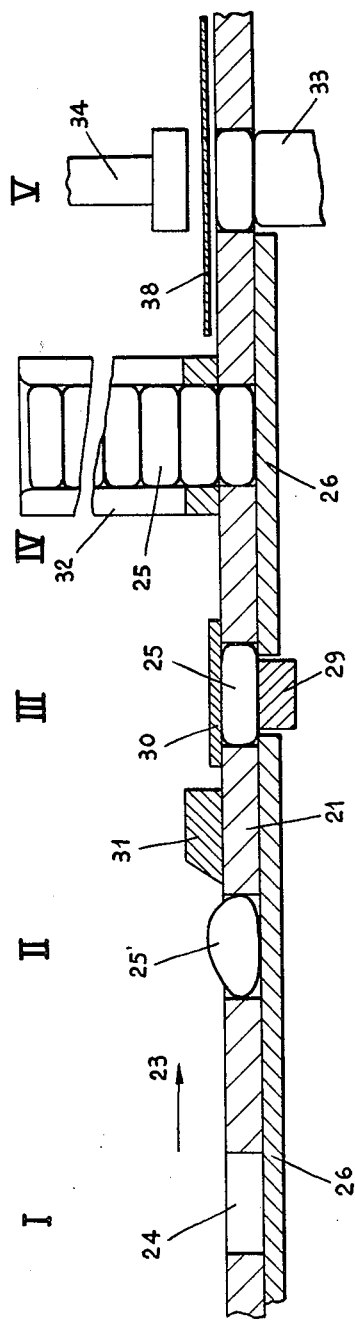
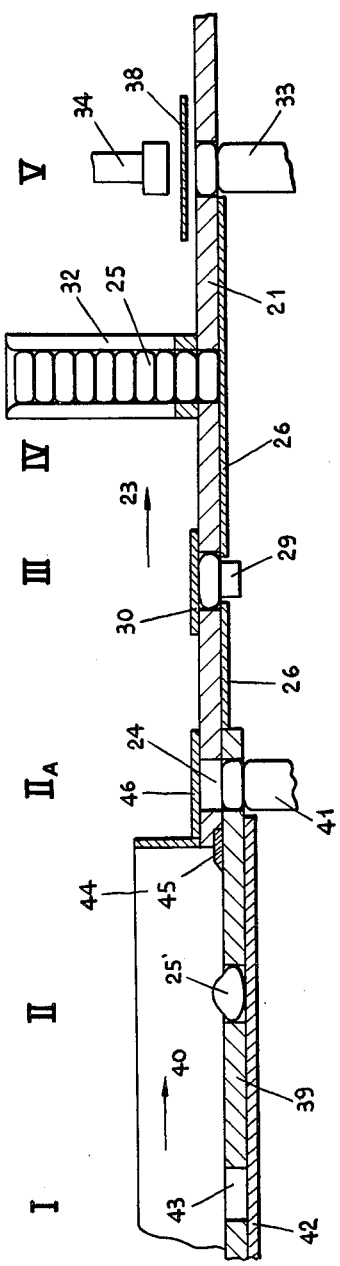
INVENTOR
Ariosto Seragnoli
BY Watson, Cole, Grindle &
Watson
ATTORNEYS March 28, 1961  A. SERAGNOLI  2,976,825
MECHANISMS FOR DELIVERING ARTICLES INTO A
MACHINE, PARTICULARLY ADAPTED TO DELIVER
CARAMELS INTO WRAPPING MACHINES
Filed April 10, 1957  3 Sheets-Sheet 2

INVENTOR
Ariosto Seragnoli
BY Watson, Cole, Grindle
& Watson
ATTORNEYS

March 28, 1961  A. SERAGNOLI  2,976,825
MECHANISMS FOR DELIVERING ARTICLES INTO A
MACHINE, PARTICULARLY ADAPTED TO DELIVER
CARAMELS INTO WRAPPING MACHINES
Filed April 10, 1957  3 Sheets-Sheet 3

INVENTOR
Ariosto Seragnoli
BY Watson, Cole, Grindle
& Watson
ATTORNEYS

UnitedStatesPatentOffice 2,976,825
Patented Mar. 28, 1961

2,976,825

MECHANISMS FOR DELIVERING ARTICLES INTO A MACHINE, PARTICULARLY ADAPTED TO DELIVER CARAMELS INTO WRAPPING MACHINES

Ariosto Seragnoli, Via Indipendenza 56, Bologna, Italy

Filed Apr. 10, 1957, Ser. No. 651,947

Claims priority, application Italy Apr. 12, 1956

5 Claims. (Cl. 107—4)

Various types of mechanisms for delivering articles into a machine are known, in which the articles to be delivered are placed within the holes of a conveyor which, by intermittently moving, causes the holes containing the articles to rest in a removal station, in which the articles are removed from the holes and delivered into a machine. Every hole usually is intended to receive and to wholly contain an article, so that the articles are delivered, one at a time, into the machine.

In the industry, the requirement for an automatic distribution of articles is continually increasing, a requirement which meets with various inconveniences. On the one hand, it is practically impossible to ensure that every hole receives an article, prior to reaching the removal station, even if all of the articles are equal between each other.

On the other hand, in the industrial production of articles in large quantities, for example caramels, amongst the articles produced there are necessarily defective articles, that is smaller articles (for instance, broken articles) or bigger articles (for instance, caramels inflated through the expansion of occluded gases, the so-called "blasts").

To ensure the proper operation of the machine to be fed, the defective articles, which eventually may have entered holes of the conveyor, have to be discarded, and this gives rise to new occasions for empty holes reaching the removal area.

On the other hand, no device for delivering articles into a machine may be considered to be actually automatic if it does not act in such a way as to ensure that every hole, which reaches the removal area, contains an article of proper shape and size, notwithstanding that properly shaped and defective articles are mixed up in the quantity of articles introduced into the mechanism.

This condition assumes a determining importance in the case of machines, which have to pile up the articles batchwise, each batch being formed from an equal number of articles, in order to form them into blocks (which are used to be called "small sticks"). In these machines, after every subsequence of a given number of removal operations, the articles delivered are wrapped up together: see, for instance, the formation of caramel blocks, etc. In this case, if the removal station is reached by an empty hole, this gives rise to an incomplete block, thus causing waste material or requiring complicated devices to obviate this inconvenience.

In the present invention, these inconveniences are obviated by suitable devices. Namely:

One object of the invention is to provide an auxiliary feeding store arranged prior to the removal station, to fill with articles of a suitable size the holes which otherwise would arrive empty at the removal station;

Another object of the invention is to provide a feeler for the articles contained in the holes prior to reaching the removal station, to discard the defective articles. Said feeler may be arranged so as to cooperate with the auxiliary store, and prior to the latter;

Still another object of the invention is to provide a scraper for the articles surpassing the proper size, which removes from the too big articles the portion surpassing the size as admitted, to give them the exact dimensions or to crush them. The scraper may be located so as to cooperate with the feeler and with the auxiliary store, by being arranged prior to both of them.

The invention, by way of illustration only, without any limitation, in connection with a disc mechanism for delivering articles into a machine, is disclosed in the following specification with reference to the accompanying drawings, in which:

Fig. 1 is a diagrammatic partial vertical section, according to line 11—11 of Fig. 2, of a preferred form of embodiment showing a mechanism in accordance with the invention;

Fig. 3 is a diagrammatic partial vertical section of another preferred form of embodiment of the invention, according to line 12—12 of Fig. 4;

Figure 2:
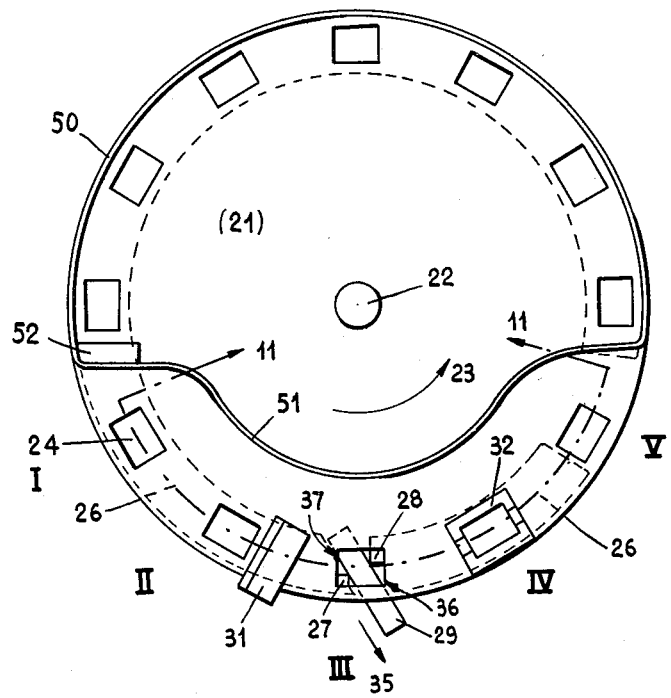
Fig. 2 is a plan view of the mechanism of Fig. 1, in which parts 30, 34 and 38 are omitted.
Figure 5:
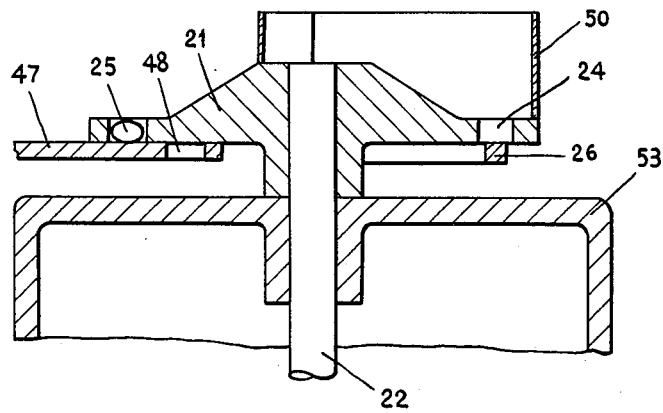
Fig. 5 shows a diagrammatic vertical section of another preferred form of embodiment of the invention, according to line 13—13 of Fig. 6.
Figure 6:
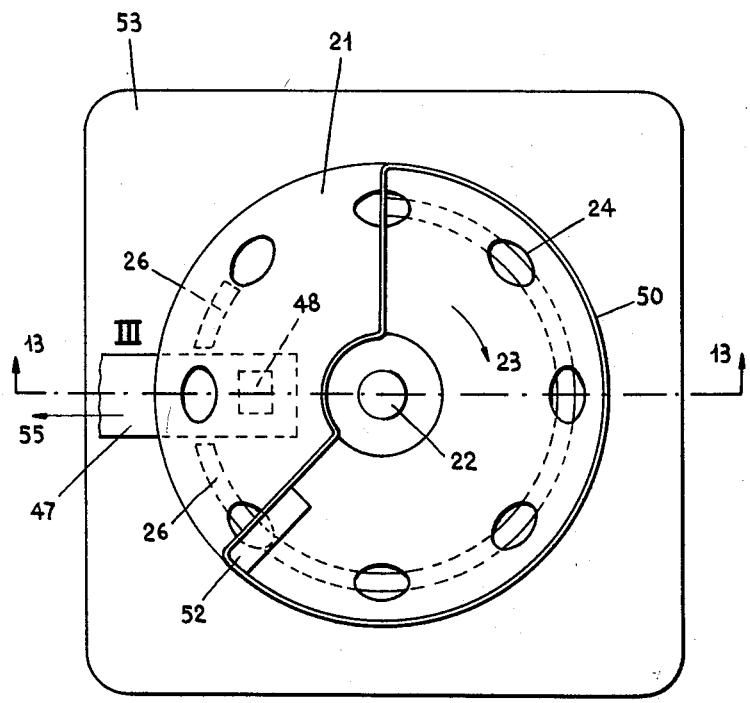

Fig. 6 is a plan view of the mechanism of Fig. 5. According to the preferred form of embodiment as shown in Figs. 1 and 2, the invention comprises a disc 21 carried by shaft 22 and caused to intermittently rotate in the direction of arrow 23 by a suitable mechanism of the usual type, not shown, for example a maltese cross mechanism.

Shaft 22 is pivoted in a stationary base, not shown.

Disc 21 on the periphery is provided with holes 24, each intended to receive and to wholly contain an article 25 to be delivered into a machine.

The rotation of disc 21 is performed in such a way as to cause holes 24 to rest, one after the other, in fixed positions indicated in the figures as stations I, II, III, IV, V.

The manner in which the articles are placed into the holes 21 has no importance for the present invention: for a better understanding, it is merely to be borne in mind that the articles, for example, may be introduced into the holes by hand.

Upon the disc a wall 50, 51, Fig. 2, may be provided, which in an enclosure intended to receive the articles in bulk embraces a portion of the area lying above the disc, according to U.S. Patent No. 2,744,370 in the name of Ariosto Seragnoli dated May 8, 1956; the articles, which fall down and enter the holes, pass beneath a separator 52 and reach the stations indicated in I to V.

Figure 4:
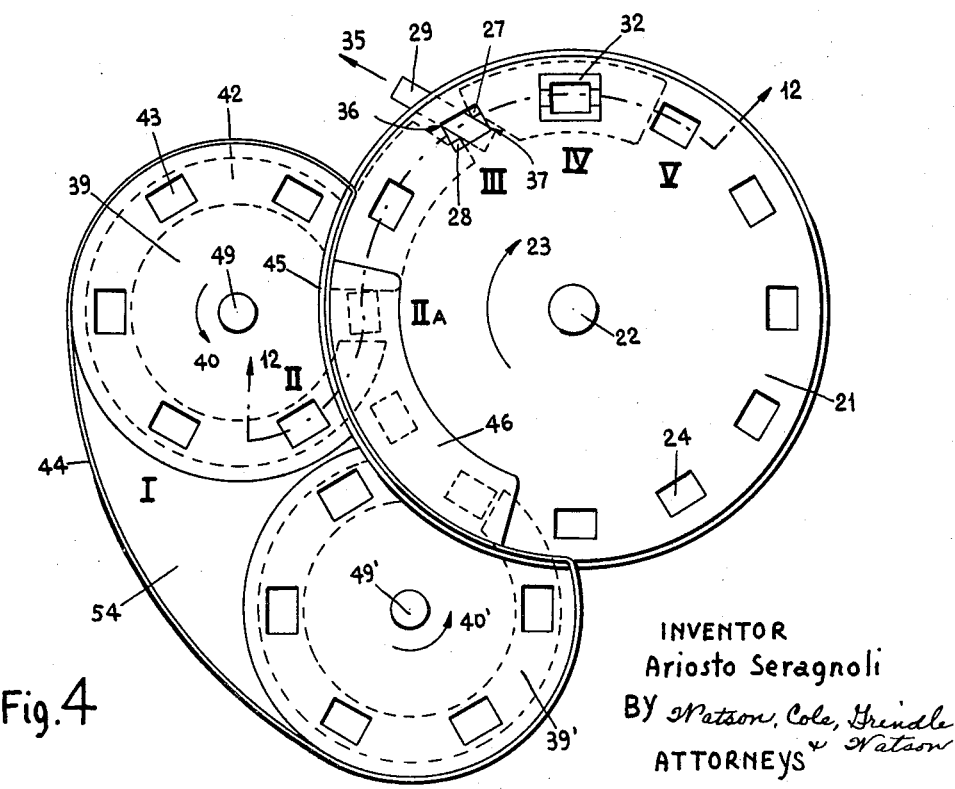
Fig. 4 is a downward plan view of the mechanism of Fig. 3, in which parts 30, 34 and 38 are omitted.

Also distributing discs 39, 39', Fig. 4, according to U.S. patent application No. 641,321, in the name of Ariosto Seragnoli, may be provided.

Said discs are carried by shafts 49, 49' which are guided in a stationary base and capable of intermittently rotating around stationary axes in the direction of arrows 40, 40' and, by cooperating with a stationary plane 54 provided between them and an enclosure 44 and on the stationary plane, they form a tray intended to receive in bulk the articles to be distributed. The discs are provided with holes 43, into which drop and enter the articles sustained in the holes by underlying supports 42 secured to the base.

The discs 39, 39' cooperate with a conveying disc 21, under which the articles 25 are conveyed to a transfer station IIA, in which, during a rest of discs 39 and 21, the holes of the distributing discs and of the conveying disc are superposed, and a lifting element 41 transfers the articles from the distributing discs to the conveying disc. During this operation, a small plate 46 prevents the articles from being thrown past disc 21.

Of course, also other devices may be made use of.

Under the holes 24 a stationary support 26 is provided, which is carried by the base, to sustain the articles within said holes. The support 26 is interrupted under station III to permit the projection of a plate under article 25, which latter is being stopped thereon, due to two abutments 27 and 28, upon which the article abuts with the ends.

Into the discontinued part a small tongue 29 may be inserted and removed therefrom, which offers the article an abutment nearly on its whole surface, except for the abutments 27, 28.

Above hole 24 in station III a small stationary counter-plate 30 is provided, which is tangent to the upper edge of disc 21 and carried by the base.

Prior to station III (between station II and station III in Figure 1), above disc 21 and close thereto, a stationary scraper knife 31 is provided, which is carried by the base.

In station IV above the disc an auxiliary store 32 is provided, in which manually or through any suitable means supplemental articles 25 are piled up one above the other. The store 32 is open at the bottom, so that, when the hole, which is being stopped under it, is empty, an article drops down from the store to fill it up.

The auxiliary store is charged with selected articles, all of proper shape and size. The charge may be effected intermittently by hand, or it may be performed automatically or semi-automatically by means of feeders of the usual type.

In station V, below the disc 29 a lifting element 33 is provided in another discontinued part of support 26; above the disc a counter-lifting element 34 is arranged.

In this station one or more sheets of enveloping material, shown in 38, by usual means may be conveyed between the article and the counter-lifting element, to prepare the first phase of the wrapping operations.

The operation is as follows:

The holes of disc 21 pass subsequently to the stations I to V, see Figure 1, by stopping in each one of them.

In station II an article 25' is shown, which is defective owing to its improper size.

When disc 21 advances by a step, article 25', by passing under the scraper knife 31, is cut and reduced to the exact size or broken up.

If it assumes the right dimensions, it will keep on moving as far as to reach removal station V and is then fed into the machine; if it breaks up, it will be discarded in the subsequent station III.

The separation of the defective articles in station III takes place as follows: Every time a hole stops in station III, the supporting tongue 29, by suitable means, not shown, is shifted outwards in the direction of arrow 35 as far as to cause the article to abut merely with the two ends upon the supporting abutments 27 and 28.

Of course, if the article becomes broken or defective at one of the two abutments, it drops down and is discarded. If it is unbroken, it does not drop down, because of its being incapable of rotation around the line connecting the points of the abutments insofar as it may be prevented from doing so by the counter-plate 30.

However, if it is broken or defective at one of the points 36 and 37, no contrast of the small plate 30 can take place and the article, which is being drawn by the unbalanced weight, rotates upon the axis connecting the points of abutment and drops down, to be discarded.

When the supporting tongue 29 is extracted from the supporting zone, the article 25 is merely supported by the abutments 27, 28 and by the contrasting action of plate 30. An article, which should bear only on 27, 28 and should not be otherwise engaged, might fall down, even if it is intact and has regular dimensions, by turning upon itself and by entering edgewise one of the spaces which are left between 27, 28 and the border of the hole. Thus, it will be necessary to use plate 30 which prevents only the intact articles from falling down, whereas it permits those articles to fall down which are unable to rest with the ends on the abutments 27, 28 and those articles which, although they rest on 27, 28, are somewhat broken lengthwise.

This feeling or testing system is particularly suitable for articles having a flattened, rectangular and square shape, as those shown in the drawings. In this case, nearly all of the broken articles are discarded; of course, it will be possible to provide various other types of feelers based on the same principle, in which, for instance, the article is tested by trying, in two subsequent phases, whether it drops down or not, when it is sustained by superposed abutments one in 27, 28 and another time in 36, 37. By means of this modification it would be possible to make use of two series of abutments 27, 28 and 36, 37, respectively, upon which the article would be tested in two subsequent phases. This would require for the said abutments to be retractile, so as to be able to first test the articles on the abutments 27, 28 by previously retracting abutments 36, 37 and, subsequently, by carrying back under the articles the abutments 37, 38 and by withdrawing the abutments 27, 28 so as to repeat the test.

Upon having terminated the testing phase, the tongue 29 is again withdrawn from between the abutments 27 and 28 and re-establishes the continuity of the abutment, to permit the articles, which have not been discarded, to slide upon said tongue and to be dragged forward to the subsequent stations by the movement of the disc.

Let us now consider station IV. When it is reached by a hole containing an article, the article 25 contained in store 32 are unable to drop down and everything proceeds as if said store did not exist.

If instead a hole 24, which had reached station I empty or contained articles which are then discarded in station III, reaches and stops empty at station IV under the auxiliary store 32, then from the latter an article drops down so as to fill the empty hole in the case of Figs. 1 and 2.

The merits of this arrangement are that, by the addition in stack 32 of a number of articles which is generally rather small with respect to the total number of articles fed into the machine, it will be achieved in quite a sure manner that all of the holes which reach removal station V be full, which is quite advantageous.

When a hole is stopping in station V, the article and eventually one or more sheets of enveloping material, as indicated in 38, will be taken between the lifting element 33 and counter-lifting element 34, which get hold of them and then ascend simultaneously to convey them into a machine.

In this phase the lifting element 33 moves upwards by passing into hole 24; of course, there are possible other solutions for removing the articles from holes 24, as are usually made use of in practical and already known embodiments.

In the alternative form of Figs. 3 and 4 the articles are transferred to the conveying disc 21 by two distributing discs 39, 39' capable of intermittently rotating in the direction of arrows 40, 40'.

There are phases of rest, in which the holes of the distributing discs and the conveying disc are superposed, and transfer elevators 41 convey the articles from the distributing discs to the conveying disc, which moves them forward.

The constitution and operation of a mechanism of this kind is disclosed in the cited patent and they are of interest here only in connection with the manner in which the objects of the present invention may be applied, which manner is clearly shown in Fig. 3. In this case, the characteristic element is selected and the scraper knife, which is formed in the lower edge of conveying disc 21, is preferably provided with a cutting insertion piece 45 as shown in the drawing.

Said system renders more efficient the action of the scraper knife, which acts upon the article also with a tangential motion.

For the remainder, the said alternative form of embodiment perfectly corresponds to the devices and the manner of working already disclosed.

A further alternative form of embodiment of the invention, concerning the feeler of the broken articles, is shown in Figs. 5 and 6.

The holes 24 containing the articles to be tested are resting in station III upon a small plate 47 which is inserted in an interruption of support 26.

The small plate is provided with a hole 48 which is somewhat smaller than the articles to be tested.

During said condition of rest, the small plate shifts outwards so as to move hole 48 under the articles 25. If said article is broken or its size is too small, it drops through hole 48 and is discarded. If it is of the right size, it does not drop: the small plate 47 moves again inward, into the position shown in the figure, so as to re-establish the continuity of the abutment, and, during the subsequent rotation, disc 21 shifts forward the hole and the article contained therein, towards the removal station.

Of course, also in this case, prior to station III a scraper knife may be provided, and after station III a station IV with an auxiliary store may be located, which devices are omitted in Figures 5 and 6.

Obviously, the system for filling the holes of conveyor 21, before the reach station I, may be of any suitable type.

Moreover, the conveyor might be of the chain type or of any other type. The auxiliary store, the feeler for defective articles and the scraper knife can also be applied singly or in any combination between each other and with other devices.

The auxiliary store may also be of a different type, while maintaining unchanged its function and application. The means for removing the articles from the conveyor and for feeding them into a machine may be of any known type, without thereby departing from the field and the protection of the present patent.

What I claim is:

1. A mechanism for delivering articles into a machine, comprising intermittently advancing conveying means provided with a series of spaced holes and a plurality of spaced work stations arranged thereover, said stations comprising in sequence a filling station, a testing station, an auxiliary filling station and a removal station, each hole being so located in the means as to receive and to entirely contain an article to be carried to the removal station, a stationary support provided under the holes in the conveying means to support said articles in said holes, an auxiliary storage means disposed above the conveying means at the auxiliary filling station for filling an article into any empty hole passing thereunder, a counter plate for the testing station and arranged above the conveying means in contact therewith, the stationary support being interrupted and projecting only at two stationary and diagonally opposite points of abutment under the article which stops at said testing station in registry with the respective hole, a small tongue for the abutments adapted to be inserted into the interruption to ensure a sufficient continuity of the abutments when the conveying means is moving, whereas, if the conveying means is stopped, said tongue is withdrawn from underneath the article, permitting it to abut on only the two stationary and diagonally opposite points of abutment, so that, if the size of the article is smaller, it drops down and is discarded, the testing station being provided between the filling station and the auxiliary filling station, and a scraping knife located between the filling station and the testing station to remove excess material from the article.

2. A mechanism for delivering articles into a machine comprising intermittently advancing conveying means provided with a series of spaced holes and a plurality of spaced work stations arranged thereover, said stations comprising in sequence a main filling station, a testing station, an auxiliary filling station, and a removal station, each hole being so located as to receive and to entirely contain an article and to be carried to the removal station, a stationary support provided under the holes to support said articles in said holes, an auxiliary storage means disposed above the conveying means at the auxiliary filling station for filling an article into any empty hole passing thereunder, a movable tongue at the testing station which passes into an interruption between the stationary support and may assume two positions, the first position of the tongue under the moving conveyor means re-establishing the continuity of the supports so as to permit the forward conveyance of the articles contained in the holes of the conveyor means and the second position with the conveyor means in the condition of rest with the tongue shifted so as to convey under the article a comparison hole of suitable dimensions through which the articles of insufficient dimensions may drop down and are discarded, the testing station being provided between the main filling station and the auxiliary filling station, and a scraping knife provided between the main filling station and the testing station to remove excess material from an article.

3. A mechanism for delivering articles into a machine, comprising intermittently advancing conveying means provided with a series of spaced holes and a plurality of spaced work stations arranged thereover, said stations comprising in sequence a filling station, a testing station, an auxiliary filling station, and a removal station, each hole being so located as to receive and to entirely contain an article and to be carried to the removal station, a stationary support provided under the holes to support said articles in said holes, an auxiliary storage means disposed above the conveying means at the auxiliary filling station for filling an article into any empty hole passing thereunder, the conveying means stopping at the testing station before reaching the auxiliary station, and a scraping means under which the articles pass before reaching said testing station, the testing station being provided between the filling station and the auxiliary filling station, and the scraping means located between the main filling station and the testing station.

4. A mechanism for delivering articles into a machine, comprising intermittently advancing conveying means provided with a series of spaced holes and a plurality of spaced work stations arranged thereover, said stations comprising in sequence a main filling station, a testing station, and an auxiliary filling station, each hole being so located as to receive and to entirely contain an article and to be carried to the removal station, a stationary support provided under the holes to support said articles in said holes, an auxiliary storage means disposed above the conveying means at the auxiliary filling station for filling an article into any empty hole passing thereunder, a scraping means under which the articles pass before reaching said testing station, the scraping means having a stationary knife closely disposed to the conveying means to scrape the portion of each article protruding from the respective hole, the testing station being provided between the main filling station and the auxiliary filling station, and the scraping knife being located between the main filling station and the testing station.

5. A mechanism for delivering articles into a machine, comprising intermittently advancing conveying means provided with a series of spaced holes and a plurality of spaced work stations arranged thereover, said stations comprising in sequence a main filling station, a testing station, and an auxiliary filling station, each hole being so located as to receive and to entirely contain an article and to be carried to a removal station, a stationary support provided under the holes to support said articles in said holes, an auxiliary storage means disposed above the conveying means at the auxiliary filling station for filling an article into any empty hole passing thereunder, the holes in the conveying means stopping at the testing station before reaching the auxiliary filling station, a distributing disc, and a conveying disc partially overlapping said distributing disc, the lower edge of said conveying disc being provided with a knife-shaped portion acting as a scraper for the articles protruding from the holes of the distributing disc, the testing station being provided between the main filling station and the auxiliary filling station and the knife-shaped portion being located between the main filling station and the testing station.

References Cited in the file of this patent

UNITED STATES PATENTS

| | | |
|---|---|---|
| 743,686 | Buehne | Nov. 10, 1903 |
| 1,904,742 | MacFarlane et al. | Apr. 18, 1933 |
| 2,212,676 | Vosler | Aug. 27, 1940 |
| 2,273,782 | Irwin | Feb. 17, 1942 |
| 2,283,885 | Toelke et al. | May 19, 1942 |